United States Patent [19]

Little

[11] Patent Number: 4,606,548
[45] Date of Patent: Aug. 19, 1986

[54] SKI SCOOTER

[76] Inventor: Stevin G. Little, 3926 N. Safford, Fresno, Calif. 93704

[21] Appl. No.: 679,025

[22] Filed: Dec. 6, 1984

[51] Int. Cl.⁴ ............................................. B62B 13/04
[52] U.S. Cl. .................... 280/12 H; 280/28; 280/87.04 R; 280/12 K; 296/205
[58] Field of Search ............ 280/12 K, 12 KC, 12 H, 280/12 R, 16, 18, 21 R, 87.04 R, 87.04 A, 607, 11.17, 23, 28; D21/81, 226, 224; 296/205

[56] References Cited

U.S. PATENT DOCUMENTS

| D. 176,725 | 1/1956 | Laibow | D21/81 |
|---|---|---|---|
| D. 184,499 | 2/1959 | Van Slooten | 280/12 K |
| D. 213,790 | 4/1969 | Berglund | D21/81 |
| 3,620,547 | 11/1971 | Vaverek | 280/87.04 A |

FOREIGN PATENT DOCUMENTS

| 1006290 | 4/1957 | Fed. Rep. of Germany | 280/16 |
|---|---|---|---|
| 614927 | 12/1926 | France | 280/16 |
| 1036994 | 9/1953 | France | 280/7.13 |
| 2428452 | 2/1980 | France | 280/12 H |
| 34192 | 12/1905 | Switzerland | 280/16 |

Primary Examiner—David M. Mitchell
Attorney, Agent, or Firm—Jack C. Munro

[57] ABSTRACT

A ski scooter designed particularly to be used on snow which utilizes an arcuate frame assembly defining an elongated bottom wall from which extends a forward wall in an upward direction at the forward end of the bottom wall. Attached to the upper end of the forward wall is a handle assembly. The handle assembly is capable of movement in respect to the remaining arcuate frame through a shock absorbing assembly. A ski runner is attached at the bottom surface of the bottom wall and is capable of a limited longitudinal adjustment in respect thereto.

3 Claims, 4 Drawing Figures

U.S. Patent  Aug. 19, 1986  4,606,548
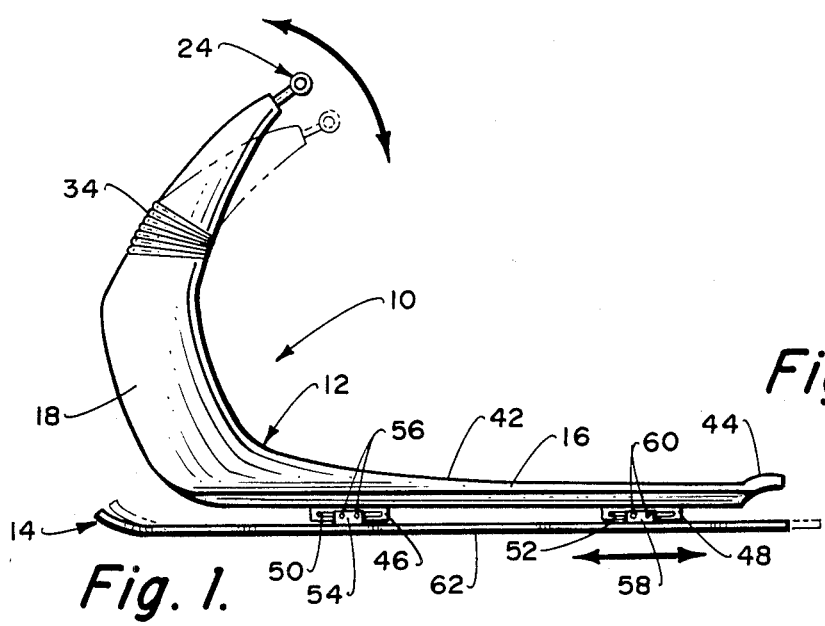
Fig. 1.
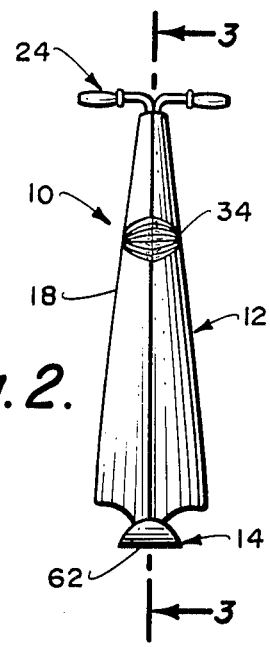
Fig. 2.
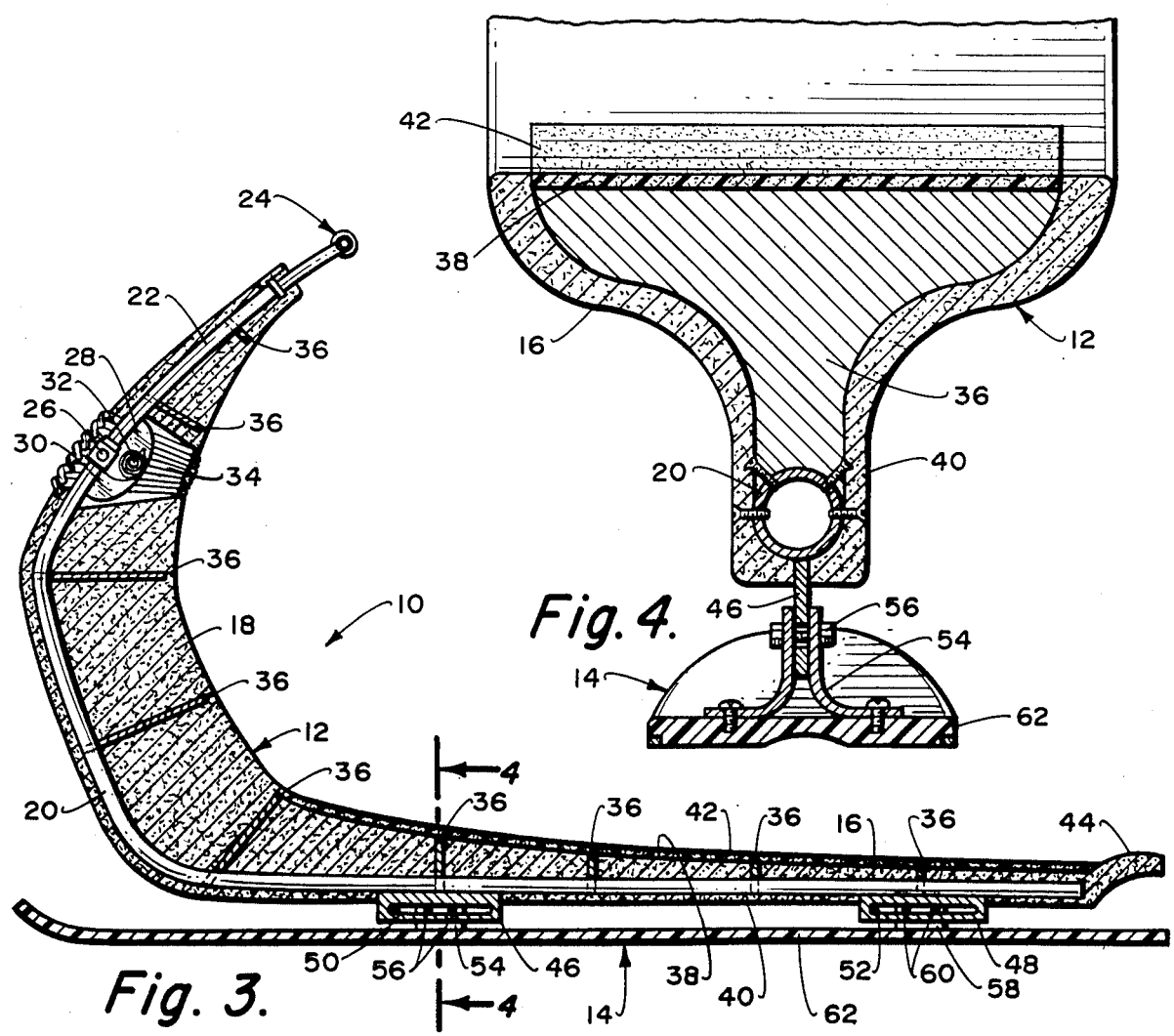
Fig. 3.
Fig. 4.

SKI SCOOTER

BACKGROUND OF THE INVENTION

The field of this invention relates to recreational devices and more particularly to a skiing device which is constructed to be utilized as a scooter and normally occupied by a single person.

It has been common practice to utilize a pair of skis in traversing snow covered terrain. As is well known, each of these skis consist of a single extended runner, curved upwardly at the front end, and includes some type of fastening to facilitate attachment to the foot of the skier. Considerable skill is required to utilize these skis for the operator to continually maintain balance and control the path of travel by exerting the proper pressures through the skiers legs and feet to the skis.

There seems to be an ever increasing number of people getting involved with the sport of skiing which means that a great number of people are classified as beginners. Therefore, because considerable skill is required for balance during skiing, and also the skier may find himself quickly moving at an unreasonable rate of speed, skiing has become known as a somewhat of a dangerous sport. Injuries are common, and even deaths do occur.

The sport of skiing (sliding along at ten, twenty, thirty miles an hour along the snow) is a sufficiently attractive enough form of entertainment to human beings to cause the human beings to continually want to be involved with the sport even though there is a possibility of death or injury. Certain people do realize the danger of skiing and therefore avoid it. Parents, at times, will prevent their children from getting involved in skiing because of its inherent danger.

There is a need to construct some form of recreational vehicle which can essentially duplicate the movement of a skier on snow, but yet does so at a substantially decreased injury risk. There is also a need to construct some form of snow skiing device which can be utilized by women, children, occasional skiers, experts and senior citizens which requires minimal teaching in order to operate the device.

SUMMARY OF THE INVENTION

The recreational device of the present invention is directed to constructing a skiing device in the form of a scooter. A scooter is generally defined as a vehicle consisting of a low narrow foot board with a wheel at each end. Attached to the front wheel is an elongated handlebar assembly for steering. The scooter is generally moved by a series of pushes made by one of the operator's foot against the ground upon which the scooter is supported. The scooter of the present invention utilizes an elongated bottom wall, the forward end of which is integrally connected to an upstanding forward wall. The uppermost end of the forward wall is attached to a handlebar assembly. Connected between the handlebar assembly and the forward wall is a shock absorbing assembly. The rearwardmost edge of the bottom wall includes a raised section which functions to be a warning indicator that the operator is getting very near to falling off the back end of the scooter. A ski runner is attached to the bottom surface of the bottom wall in lieu of wheels. The ski runner is attached in a way to provide for limited longitudinal adjustment of the ski runner in respect to the frame of the ski scooter for reasons of support and also to facilitate manufacture thereof there is incorporated a single rigid tubular member centrally disposed throughout the entire length of the frame assembly.

One of the primary objectives of the present invention is to construct a recreational vehicle which can be used by adults, senior citizens, children, experts and beginners alike which requires a minimal amount of teaching in use of the device.

Another objective of the present invention is to construct a device which minimizes the operator's contact with the snow, thereby minimizing exposure of the operator to wet and cold which frequently causes discomfort to the operator thereby minimizing the amount of time that the operator can remain in the snowy environment.

Another objective of the present invention is to include within the structure of the ski scooter a shock absorbing system to minimize the amount of shock to be transmitted to the upper body of the operator as the scooter traverses over uneven terrain.

Another objective of the ski scooter of the present invention is to construct a scooter with an adjustable ski runner so as to permit variation of the level of difficulty between a more expert operator and a beginning operator.

Another objective of the ski scooter of the present invention is that it is designed to be light in weight and easily carried by even a low strength individual on a conventional skiing chairlift.

BRIEF DESCRIPTION OF THE DRAWING

FIG. 1 is a side elevational view of the ski scooter of the present invention depicting the shock absorbing motion of the handlebar assembly and the adjustable movement of the ski runner;

FIG. 2 is a front elevational view of the ski scooter of the present invention;

FIG. 3 is a cross-sectional view of the ski scooter of the present invention taken along line 3—3 of FIG. 2; and FIG. 4 is a cross-sectional view taken through a portion of the ski scooter of the present invention taken along line 4—4 of FIG. 3.

DETAILED DESCRIPTION OF THE SHOWN EMBODIMENT

Referring particularly to the drawing there is shown the ski scooter 10 of this invention which is composed generally of an arcuate frame assembly 12 and a ski runner assembly 14. The arcuate frame 12 is divided between a bottom wall 16 which is integrally connected at the forward end thereof to an upstanding forward wall 18.

The arcuate frame assembly 12 has as its main support member a rigid tube 20 which extends substantially the entire length of the bottom wall 16 and the entire length of the forward wall 18. A portion 22 of the tube 20 is designed to be movable in respect to the tube 20 between an upward extending position to a collapsed position which is shown in phantom lines within FIG. 1. The outer end of the portion 22 is connected to a handle assembly 24 which is adapted to be grasped by the operator. Movement between the portion 22 and the tubular member 20 occurs by pivoting about bolt 26.

Connected to the portion 24 is a thin plate 28. A similar thin plate 30 is connected to the tubular member 20 directly adjacent the bolt 26. Between the plates 20 and 30 is mounted a spring assembly 32. The function of the spring assembly 32 is to exert a continuous bias tending to locate the portion 22 in the extended position as shown in the solid lines in FIGS. 1 and 3 of the drawing. Any unusual or unexpected shock absorbing upward movement of the ski scooter 10 during usage will cause deflection of the handle assembly 24 (and the portion 22) by pivoting about the bolt 26 against the bias of the spring 32. Therefore, this pivoting and biasing arrangement functions as a shock absorbing assembly. To protect the spring 32 and the bolt 26 from contamination by foreign material there is located thereabout a rubber sleeve 34.

The tube 20 and the portion 22 are transversely centered with respect to frame 12. Mounted on the tube 20 and the portion 22 in a fixed manner are a plurality of plate-like ribs 36. It is to be noted that there are nine in number of the ribs 36 located in a spaced-apart manner over the entire length of the tube 20 and the portion 22. However, the number of the ribs 36 is deemed to be a matter of choice and may be increased or decreased. Also, the spacing between the ribs 36 is deemed to be a matter of choice.

The function of the ribs 36 is to provide support for the fiberglass material utilized to construct the shape of the body of the arcuate frame assembly 12. Although fiberglass has been found to be desirable, it is considered to be within the scope of this invention that other material could be utilized without departing from the scope of this invention.

The bottom wall 16 has an upper surface 38 and a bottom surface 40. Mounted on the upper surface 38 is a layer 42 of frictionally grabbing material. A desirable form of the layer 42 would be a rubber grip which is impregnated with particulate matter such as sand, fine gravel or pulverized walnut shells or the like. The function of the layer 42 is to prevent the operator from sliding off of the bottom surface 16 during operation of the ski scooter 10 of this invention.

Also, it would be undesirable to have the operator move to the point to where he justs steps off the back end of the ski scooter 10. In order to prevent this, it is desirable to include a raised section 44 attached to the bottom surface 16 at the rearwardmost end thereof. When the operator's feet encounters the raised section 44, it is to give an indication to the operator to move himself somewhat in the forward direction of the scooter 10 to prevent the operator from slipping off the back end of the ski scooter 10.

Fixedly attached as by welding to the tube 20 are a pair of spaced-apart attaching plates 46 and 48. Formed within the plate 46 is an elongated slot 50. A similar elongated slot 52 is formed within the plate 48. The plates 46 and 48 protrude exteriorly from the bottom surface 40.

A mounting bracket assembly 54 is fixedly mounted by means of a fastening bolt assembly 56 to the plate 46. The bolts 56 connect within the slot 50. It can be seen that the longitudinal position of the bolts 56 can be adjusted longitudinally with the amount of adjustment limited by the length of the slot 50. Once the desired longitudinal adjustment has been obtained, the bolts 56 are to be tightened.

A smimlar mounting bracket assembly 58 is connected by a bolt assembly 60 to the plate 48 through the slot 52. Again, mounting bracket assembly 58 is adjustable longitudinally an amount limited by the length of the slot 52. Also, the adjustment of the mounting bracket 58 is simultaneous with the adjusting of the mounting bracket assembly 54.

Both the mounting bracket assemblies 54 and 58 are mounted onto ski runner 62 of the ski runner assembly 14. The ski runner 62 is constructed to be an elongated rigid substantially planar member the forwardmost end of which is turned in an upward direction. The actual construction of the ski runner 62 is to be in a shape of a conventional snow ski.

In operation of the ski scooter 10 of the present invention, the operator rests his feet on the layer 42 and holds handle assembly 24. Initial propelling movement of the ski scooter 10 is to be accomplished by the operator pushing one foot against the snowy ground to initiate the sliding movement of the ski scooter 10. After such initial movement, the ski scooter 10 will continue to propel itself as normally the ski scooter will move in a generally downward (by gravity) direction.

If the operator is a more advanced skier, the operator will normally adjust the position of the ski runner 62 to be generally more forward with respect to the frame assembly 10. This will cause turning to be greater in degrees and will also provide for faster speed. For the beginning operator, it will normally be desirable to have the ski runner 62 to be positioned more to the rearwardmost end of the slots 50 and 52 for shorter turns and lower speeds.

What is claimed is:

1. A ski scooter comprising:
an arcuate frame assembly defining an upstanding forward wall and an elongated bottom wall, said bottom wall having a bottom surface and an upper surface, said upper surface being adapted to support a human being in standing position, said arcuate frame assembly including a rigid tubular center support extending the entire length of said frame assembly, said frame assembly including a plurality of spaced-apart supporting ribs, said supporting ribs being substantially planar, said supporting ribs being mounted substantially transverse to said center support, said frame assembly including a body, said body being supported on said supporting ribs;
a handle assembly adapted to be grasped by a human being, said handle assembly being connected by connection means to said forward wall, said connection means including a shock absorbing assembly; and
a ski runner attached by attaching means to said bottom surface, said attaching means being fixedly secured onto said tubular center support, said attaching means permitting longitudinal adjustment of said ski runner in respect to said frame assembly, whereby said ski runner is adapted to slide upon the surface on which it rests during movement of said ski scooter.

2. The ski scooter as defined in claim 1 wherein:
said shock absorbing assembly comprising a spring assembly, said handle assembly being movable between an extended position and a collapsed position, said spring assembly exerting a constant bias on said handle assembly tending to locate said handle assembly in said extended position.

3. The ski scooter as defined in claim 1 wherein:
a raised section mounted on said frame assembly at the free rear end of said bottom wall, said raised section functioning as an indicator for the operator to indicate that the operator is reaching the very rearwardmost section of said ski scooter.

* * * * *